United States Patent

[11] 3,600,013

[72] Inventor John P. Doering, Jr.
 Santa Ana, Calif.
[21] Appl. No. 19,618
[22] Filed Mar. 16, 1970
[45] Patented Aug. 17, 1971
[73] Assignee Beckman Instruments, Inc.

[54] ROTOR ASSEMBLY
 7 Claims, 7 Drawing Figs.
[52] U.S. Cl. .................................................. 287/52.08
[51] Int. Cl. .................................................. F16d 1/06
[50] Field of Search .................................. 287/52.08,
 52.05, 53 LK, 52

[56] References Cited
 UNITED STATES PATENTS
 642,275 1/1900 Zacharias ............... 287/52.08 UX
 2,151,045 3/1939 Ploehn ..................... 287/52.08
 3,164,402 1/1965 Jobe ......................... 287/52.05

FOREIGN PATENTS
1,420,242 10/1965 France ..................... 287/52.05

Primary Examiner—David J. Williamowsky
Assistant Examiner—Andrew V. Kundrat
Attorneys—Fern L. Mehlhoff and Robert J. Steinmeyer ABSTRACT: A rotor assembly for attaching a rotor member to a rotatable shaft including a shaft opening through which is positioned a rotary shaft. A U-shaped retainer is also positioned through the shaft opening between the shaft and the sidewall of the opening with one leg of the U-shaped retainer positioned against a rear surface of the rotor block and the other leg of the retainer positioned within a slot formed in the front face of the rotor block. Within the slot, between the leg of the retainer and the sidewall of the slot is positioned a setscrew which engages threads formed in the sidewall of the slot, the setscrew bears against the base of the retainer forcing it against the shaft thereby locking the rotor into place against the shaft.

PATENTED AUG 17 1971  3,600,013

INVENTOR.
JOHN P. DOERING JR.
BY
*Gerd L Mehlhoff*
ATTORNEY

ROTOR ASSEMBLY

BACKGROUND OF THE INVENTION

The present invention relates to rotors of the type employed in rotary potentiometers, switches and the like, and is more particularly directed to the structure for affixing the rotor to a rotatable shaft and for permitting indexing of the rotor at particular angular positions on said shaft.

Potentiometers and switching devices usually employ a rotor block or member which is affixed to a rotatable shaft and which carries a slipring or a conductive wiper adapted to make electrical contact with a resistance element or switch contacts positioned adjacent the rotor. The rotor is preferably formed of a nonconductive material such as brass, Bakelite or other plastic material. Existing rotor mounting arrangements usually require the drilling or coring of a radial hole for a setscrew and then tapping this hole for the insertion of the setscrew which engages the shaft and retains the rotor in position with respect to its angular location on the shaft. Drilling and tapping are expensive machine operations. If the rotor is formed of a plastic material it is necessary to provide complicated molds using a core, for forming the hole for the setscrew and means must be provided for removing or sliding the core from the mold so that the part may be removed.

Another problem with regard to "setscrew-type rotors" is the difficulty in assembling or aligning the rotors with respect to the shaft. Once the setscrew is turned down onto the shaft it produces a small indentation which makes it difficult to change the rotor position or "phasing" by a small amount since the setscrew tends to fall back into the indentation which has previously been formed in the shaft.

It is, therefore, an object of the present invention to provide an improved rotor structure which may be easily attached to a rotary shaft.

It is another object of the invention to provide a rotor structure which permits phasing in very small increments at all positions around the shaft.

It is another object of the invention to provide a rotor structure which may be cast or molded in a simple mold which requires no sliding cores.

Further objects and advantages of the invention will become apparent to those skilled in the art from a reading of the following detailed description of the preferred embodiments of the invention, taken in conjunction with the accompanying drawing wherein:

DESCRIPTION OF THE PREFERRED EMBODIMENTS

Figure 1:
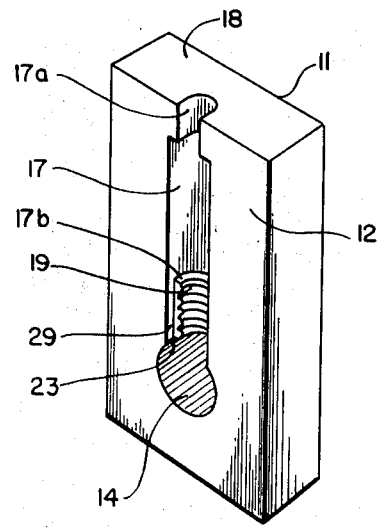
FIG. 1 is an enlarged perspective view of the rotor block of the invention.
Figure 4:
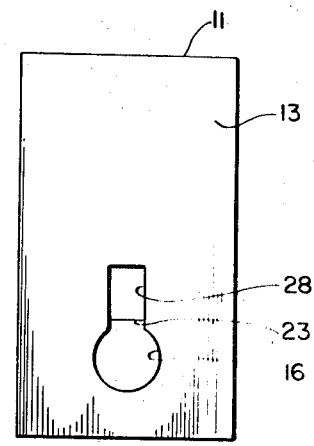
FIG. 4 is a view of the rear surface of the rotor.

Referring now to FIG. 1, there is shown a rotor block 11 which, in the illustrated embodiment, is rectangular in shape. It will be understood that the outer dimensional shape of the rotor block is not essential to the invention and it may be cylindrical, oblong, or any other shape, such as the rectangular shape shown. The rotor may be fabricated of a metal, such as aluminum or brass, or preferably it may be molded out of a plastic, such as a glass-filled nylon material. The rotor block is provided with a front surface 12 and a rear surface 13 (see FIG. 4) and includes a shaft opening 14 extending through the block. A drive shaft 16 is positioned through the opening 14. While the rotor is employed for moving electrical contacts, switching elements, etc., these components are not illustrated because they are not pertinent to those aspects of the invention associated with mounting the rotor on the shaft.

As will be seen in FIG. 1, the rotor block 11 is provided with a slot 17 which may be machined into a metal rotor or may be formed in a plastic rotor when the rotor is molded. In the illustrated embodiment, the slot 17 extends from the outer or external end 18 of the rotor block to the shaft opening and intersects the shaft opening. In this embodiment, the end sections 17a and 17b of the groove are smaller in cross section than the central section 17. Section 17b is provided with partial threads 19 along the sidewalls of the slot, which are adapted to receive and mate with the threads formed on the setscrew 21 when it is inserted into the section 17b of the slot. Portion 17 of the slot is made larger than the remaining portions 17a and 17b in order to facilitate insertion of the setscrew 21 into the lower portion 17b of the slot.

In order to retain the setscrew 21 in place against the threads 19 within the slot, and in order to provide a means for locking the rotor to the shaft, there is provided a substantially U-shaped retainer 22 which is inserted into the shaft opening 14 between the shaft 16 and the "keyed-space" 23 (see FIG. 4) between the shaft and the internal surface of the opening 14 of the rotor block. The U-shaped retainer 22 is preferably formed of metal, such as steel, brass or aluminum, and is provided with a base 24 and two upstanding legs 26 and 27. The base 24 abuts against the outer surface of the shaft 16 with leg 26 positioned against the rear face 13 of the rotor. Leg 27 extends upwardly into the slot 17 and retains the setscrew 21 in place within section 17b of the slot and forces the setscrew against the threads 19 formed in the slot.

Obviously, the retainer 22 is inserted into the keyed shaft opening 14 prior to insertion of the shaft 16. Once the shaft 16 is positioned within the shaft opening 14, the retainer 22 cannot be removed therefrom. The leg 27 of the U-shaped retainer securely holds the setscrew 21 in place so that when the setscrew is rotated, it may be tightened down against the base 24 of the retainer and imparts a force on the retainer against the shaft. The retainer base 24 acts as a pad for the setscrew 21 so that it cannot mar or produce indentations in the shaft.

Preferably the legs 26 and 27 of the retainer extend into recesses formed in the front and rear surfaces respectively of the rotor block. In the case of the leg 26, it is positioned in the recess 28 (see FIG. 4) formed in the rear surface of the block. The leg 27 extends into enlarged recess 29 formed over the section 17b. In the illustrated embodiment recess 29 is the same width as the central portion 17 of the slot. The keyed portion 23 of the shaft opening, as well as the recessed portions of the rotor block, are engaged by the sides of the retainer and the retainer legs thereby securely locking the rotor to the shaft when the retainer is tightened onto the shaft.

Figure 3:
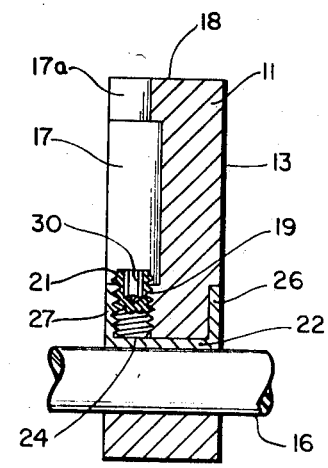
FIG. 3 is a cross-sectional view taken along line 3–3 of FIG. 2.
Figure 2:
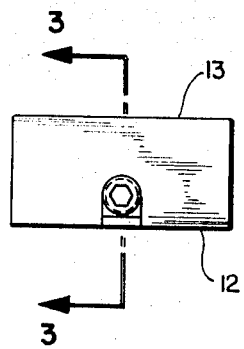
FIG. 2 is a view taken from the external end of the rotor showing the slot and the setscrew mounted therein.
Figure 5:
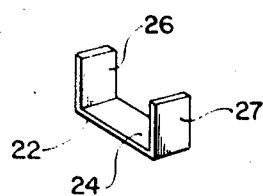
FIGS. 5, 6 and 7 are perspective view of three different modifications of the retainer to be employed with the rotor for securing the setscrew and locking the rotor to the shaft.
Figure 6:
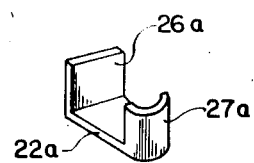
Figure 7:
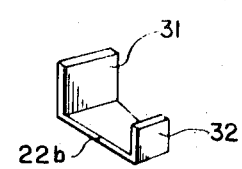

The retainer employed in FIGS. 2 and 3 is shown in perspective in FIG. 5. It may be desirable to employ other such retainers having desirable shapes for various purposes. One such shape is that shown in FIG. 6 in which the retainer 22a is provided with a rear leg 26 and a curved front leg 27a, the inner diameter of which is adapted to receive the curvature of the setscrew. In this arrangement the curvature of the retainer securely holds the setscrew in place within the slot formed in the rotor block. In FIG. 7, there is shown still another embodiment of the retainer in which the legs 31 and 32 are vastly different in size.

In order to "phase" or position the rotor 11, an appropriate tool, such as a "hex key" wrench, is inserted through a hole in the housing of the device supporting the shaft. The tool is passed through the end 17a of the slot in the rotor and positioned into the hex head of the setscrew 21. The setscrew is rotated and backed away from the retainer base 24 to relieve the locking force of the retainer against the shaft 16. The shaft is then rotated while the rotor is retained in position by the tool. Then the setscrew is again tightened against the retainer to lock the rotor to the shaft.

Obviously the setscrew may be provided with other means for its rotation. For example, the setscrew may be provided with a slotted end which may be rotated by means of a screwdriver. It is desirable, however, that the opening 17a of the slot, through which the tool is inserted, be only large enough to clear the tool or wrench. Thus, when the wrench or tool is inserted into the head of the setscrew, the sides of slot 17a aid in holding the rotor 11 securely in a desired alignment. The alignment between the hex head 30 and the opening 17a permit the rotor to be precisely positioned while the shaft is rotated.

The rotor of this invention is especially suitable for "-ganging" a number of rotors onto a single shaft, such as in an arrangement using a plurality of single-turn potentiometers. In such a case it is necessary to "phase" or locate each of the rotors with regard to its angular position on the shaft. By using rotor structure of the present invention, a number of rotors may be phased with no special fixturing. After the shaft is inserted through the rotors, their setscrews are initially clamped down. Then it is a simple task to individually adjust the position of each rotor by loosening its setscrew 21 and rotating the shaft to its desired position. Then setscrew is tightened against the base 24 of the rotor retainer and the process repeated for each rotor.

It may be desirable to provide a knurled portion on the shaft to assure improved frictional cooperation between the shaft and the base 24 of the retainer. While this has not been found actually essential, it may be desirable in some instances where the rotor is of substantial mass.

While in accordance with the patent statutes there has been described what at present is considered to be the preferred embodiments of the invention, it will be obvious to those skilled in the art that various changes and modifications may be made therein without departing from the invention and it is, therefore, the aim of the appended claims to cover all such changes and modifications as followed in the true spirit and scope of the invention.

What I claim is:

1. A rotor for a potentiometer or the like comprising:
   a rotor block having front and rear faces and a shaft opening extending therethrough;
   a slot in said front face of said rotor block, said slot communicating at one end thereof with said shaft opening, said slot having threads formed in a portion of the sidewall thereof adjacent said shaft opening;
   a rotary shaft positioned through said shaft opening in said rotor;
   a shaft retainer also positioned within said shaft opening, said retainer having a substantially U-shape with a base section positioned between the shaft and the sidewall of said shaft opening and with one leg of said U-shaped retainer positioned into said slot in said front face and the other leg of said U-shaped retainer positioned against said rear face of said rotor block, the base section of said U-shaped retainer abutting against said shaft in said shaft opening;
   a threaded setscrew positioned in said slot between said sidewalls thereof and said one leg of said U-shaped retainer, said leg of said retainer forcing said setscrew into engagement with said threads in said sidewall of said slot, said setscrew applying a force against said base of said retainer when said setscrew is rotated within said slot thereby causing said base to firmly engage the surface of said shaft and lock said rotor to said shaft.

2. The rotor defined in claim 1 in which said slot on said front face extends to the end of said rotor body so that said setscrew may be engaged by a tool inserted through said slot from the end of said rotor body.

3. The rotor defined in clam 2 in which said setscrew includes means adapting said setscrew for rotation by a tool inserted through said slot.

4. The rotor defined in claim 1 in which said slot is semicircular in cross section and a portion thereof adjacent said shaft opening is provided with partial threads formed on the bottom portion of the slot which engage the threads of said setscrew.

5. The rotor defined in claim 4 in which said one leg of said retainer is formed with a curvature adapted to receive he curved portion of said setscrew.

6. The rotor defined in claim 1 which a recess is formed on the rear face of said rotor block to receive said leg of said retainer with the sides of said leg of said retainer abutting against the sides of said recess thereby retaining said retainer securely in place with respect to said block.

7. The rotor defined in claim 1 in which the shaft opening is key-shaped with the shaft extending through the circular portion of the key-shaped opening and the retainer is positioned in the flatted portion of the key-shaped opening.